(12) United States Patent
Lampe et al.

(10) Patent No.: US 11,970,087 B2
(45) Date of Patent: Apr. 30, 2024

(54) METHOD FOR OPERATING A SEAT SYSTEM, A SEAT SYSTEM AND VEHICLE

(71) Applicant: Daimler AG, Stuttgart (DE)

(72) Inventors: Dario Wassili Lampe, Nuremberg (DE); Gudrun Schoenherr, Holzgerlingen (DE)

(73) Assignee: Daimler AG, Stuttgart (DE)

( * ) Notice: Subject to any disclaimer, the term of this patent is extended or adjusted under 35 U.S.C. 154(b) by 581 days.

(21) Appl. No.: 17/277,163

(22) PCT Filed: Sep. 17, 2019

(86) PCT No.: PCT/EP2019/074770
§ 371 (c)(1),
(2) Date: Mar. 17, 2021

(87) PCT Pub. No.: WO2020/058220
PCT Pub. Date: Mar. 26, 2020

(65) Prior Publication Data
US 2021/0370803 A1    Dec. 2, 2021

(30) Foreign Application Priority Data
Sep. 18, 2018 (DE) .................... 10 2018 007 322.0

(51) Int. Cl.
*B60N 2/02* (2006.01)
*A63B 21/002* (2006.01)
(Continued)

(52) U.S. Cl.
CPC ........ *B60N 2/0244* (2013.01); *A63B 21/0023* (2013.01); *A63B 24/0062* (2013.01);
(Continued)

(58) Field of Classification Search
CPC .... B60N 2/0244; B60N 2/0268; B60N 2/976; A63B 21/0023; A63B 2220/56;
(Continued)

(56) References Cited

U.S. PATENT DOCUMENTS 11,285,071 B2 * 3/2022 Yamaguchi ............. A61H 7/00
2017/0349061 A1   12/2017 Benson et al.

FOREIGN PATENT DOCUMENTS

CN    104182761 A    12/2014
CN    104837403 A    8/2015
(Continued)

OTHER PUBLICATIONS

Chinese Office Action issued in Chinese application No. 201980061223.X dated Jan. 10, 2023, with partial English translation (Ten (10) pages).
(Continued)

*Primary Examiner* — Milton Nelson, Jr.
(74) *Attorney, Agent, or Firm* — Crowell & Moring LLP

(57) ABSTRACT

A method for operating a seat system, where the seat system includes a vehicle seat having a plurality of controllable moveable elements integrated into a seat cushion that forms a seat surface and/or into a seat back, includes prompting, during an activated muscle training program, a user on the vehicle seat to exert a pressure with a specific body region of the user on a predetermined region of the vehicle seat in which at least one of the plurality of controllable moveable element is arranged and determining a local and a temporal deviation between a pressure exerted by the user as an input signal and a specification as an output signal.

10 Claims, 1 Drawing Sheet

(51) Int. Cl.
*A63B 24/00* (2006.01)
*A63B 71/06* (2006.01)
*B60N 2/90* (2018.01)

(52) U.S. Cl.
CPC ...... *A63B 24/0075* (2013.01); *A63B 71/0622* (2013.01); *B60N 2/976* (2018.02); *A63B 2024/0068* (2013.01); *A63B 2071/0625* (2013.01); *A63B 2071/065* (2013.01); *A63B 2071/0655* (2013.01); *A63B 2071/0675* (2013.01); *A63B 2208/0233* (2013.01); *A63B 2210/02* (2013.01); *A63B 2220/56* (2013.01); *A63B 2220/807* (2013.01); *A63B 2230/40* (2013.01); *B60N 2/0268* (2023.08)

(58) Field of Classification Search
CPC ............ A63B 24/0062; A63B 24/0075; A63B 71/0622; A63B 2208/0233; A63B 2071/0675; A63B 2071/0655; A63B 2071/065; A63B 2071/0625; A63B 2024/0068
USPC ....................................... 297/284.6
See application file for complete search history.

(56) References Cited

FOREIGN PATENT DOCUMENTS

| | | |
|---|---|---|
| CN | 107077603 A | 8/2017 |
| DE | 10 2007 053 119 A1 | 5/2009 |
| DE | 10 2009 036 278 A1 | 2/2011 |
| DE | 10 2011 102 021 A1 | 11/2012 |
| DE | 10 2014 223 629 A1 | 5/2016 |
| DE | 10 2015 004 143 A1 | 10/2016 |
| DE | 10 2016 219 165 A1 | 4/2018 |
| EP | 1 712 405 A2 | 10/2006 |

OTHER PUBLICATIONS

PCT/EP2019/074770, International Search Report (PCT/ISA/210 and PCT/ISA/220) dated Dec. 3, 2019, enclosing Written Opinion of the International Searching Authority (PCT/ISA/237), with partial English translation (Thirteen (13) pages).

Chinese Office Action issued in Chinese application No. 201980061223.X dated Jun. 30, 2022, with partial English translation (Eleven (11) pages).

\* cited by examiner

METHOD FOR OPERATING A SEAT SYSTEM, A SEAT SYSTEM AND VEHICLE

BACKGROUND AND SUMMARY OF THE INVENTION

The invention relates to a method for operating a seat system having a vehicle seat having a plurality of controllable moveable elements integrated in a seat cushion forming a seat surface and/or in a seat back. In addition, the invention relates to a seat system and a vehicle having such a seat system.

From DE 10 2009 036 278 A1, a method and a device for evaluating an action in a seat are known. The method provides that an input variable is detected, wherein a deviation is determined by comparing the input variable with a predetermined variable and a piece of feedback is provided depending on the deviation. The device comprises a processing unit which is set up to carry out the method.

The object of the invention is to specify a method for operating a seat system which is improved with respect to the prior art, an improved seat system, and a vehicle having such a seat system.

In accordance with the invention, a method for operating a seat system, in particular for carrying out a training program for a user, having a vehicle seat having a plurality of controllable moveable elements integrated into a seat cushion forming a seat surface and/or into a seat back, provides that, during an activated muscle training program, a user on the seat is prompted to exert pressure with a specific body region on a predetermined region of the vehicle seat in which at least one controllable moveable element is arranged, wherein a local and temporal deviation between the exerted pressure as an input signal and a specification as an output signal is determined.

In accordance with the invention, a method for operating a seat system which comprises a vehicle seat having a plurality of controllable moveable elements integrated in a seat cushion forming a seat surface and in a seat back provides that, during driving operation of a vehicle during an activated muscle training, a user on the seat is prompted to exert pressure with a specific body region on a predetermined region of the vehicle seat in which at least one controllable moveable element is arranged, wherein a local and temporal deviation between the exerted pressure as an input signal and a specification as an output signal is determined.

By applying the method, a motor function of the user can be improved during driving operation of the vehicle, although the user has a substantially motionless and vehicle-bound seating position. The user remains as far as possible in his/her sitting position while it is carried out, whereby a lowest possible inhibition threshold for the use of the seat system can be achieved.

By means of muscle training during the driving operation, motor skills of the user, who is a driver of the vehicle, are improved through targeted guidance of movements. By carrying out the training, monotony during driving can be counteracted in such a way that, for example, the risk of so-called microsleep is reduced.

Since the muscle training is carried out while the vehicle is being driven, the user performs a so-called dual-task training, wherein the user on the one hand steers the vehicle and on the other hand simultaneously completes the muscle training.

In order to support and control the user with regard to the execution of the muscle training, in a possible embodiment the pressure exerted by the user on the predetermined region is detected by means of at least one pressure sensor as a feedback sensor. The user thus receives feedback as to whether he/she is applying pressure to the predetermined area of the vehicle seat with his/her particular body area as quickly and precisely as possible, and whether more body areas are involved in the application of pressure than should be.

To further support the user in performing the muscle training, in a further embodiment of the method, breathing of the user during the muscle training is detected.

A rhythm of the user's breathing is compared to a predetermined rhythm, wherein feedback is provided to the user if a deviation is detected. In particular, the user's breathing is monitored such that one should exhale during a muscle contraction, i.e., when pressure is applied to the predetermined area of the vehicle seat, whereas one inhales when the corresponding muscles are relieved.

A development of the method provides that the prompt to perform a training session is output visually, acoustically and/or haptically. In this case, the signal is output in order to specify a training session as a movement task for the user. By way of example, the user himself/herself can select the way in which he/she receives the prompt.

In a further embodiment of the method, the training session is selected depending on a training level of the user. By means of an algorithm, the user is assigned to a training level based on the input signals of the seat system of previous muscle trainings.

It is also conceivable that muscle training is output depending on detected vehicle data, depending on a detected state of the user and/or depending on available user data.

If the muscle training is performed depending on detected vehicle data, an instantaneous driving situation of the vehicle is taken into account in order to define an optimised training level.

Alternatively or additionally, the muscle training is performed depending on the detected current state of the user, such that, to counteract monotony in driving, a state of the user, i.e., a state of the driver, can be improved.

If it is provided that muscle training is performed depending on user data, the user can input required user data in advance, whereby targeted muscle training can be performed.

Furthermore, the invention relates to a seat system for carrying out the method, wherein the seat system comprises a control unit for prompting the user on the vehicle seat, for controlling the moveable elements and for determining a local and temporal deviation between the exerted pressure as an input signal and a specification as an output signal, and at least one pressure sensor for detecting the input signal.

Thus, in one embodiment, the control unit is connected to a display unit for displaying a prompt to perform the muscle training, for displaying a feedback for performing the movement, and/or for displaying a selection of training units. By means of the display unit, a visual output of relevant aspects concerning the muscle training is possible, whereby the user can be supported in particular in the execution of the training sessions.

Furthermore, the invention relates to a vehicle having such a seat system, which is provided for carrying out the method.

Exemplary embodiments of the invention are explained in more detail below using the drawings.

DETAILED DESCRIPTION OF THE DRAWINGS

Figure 1:
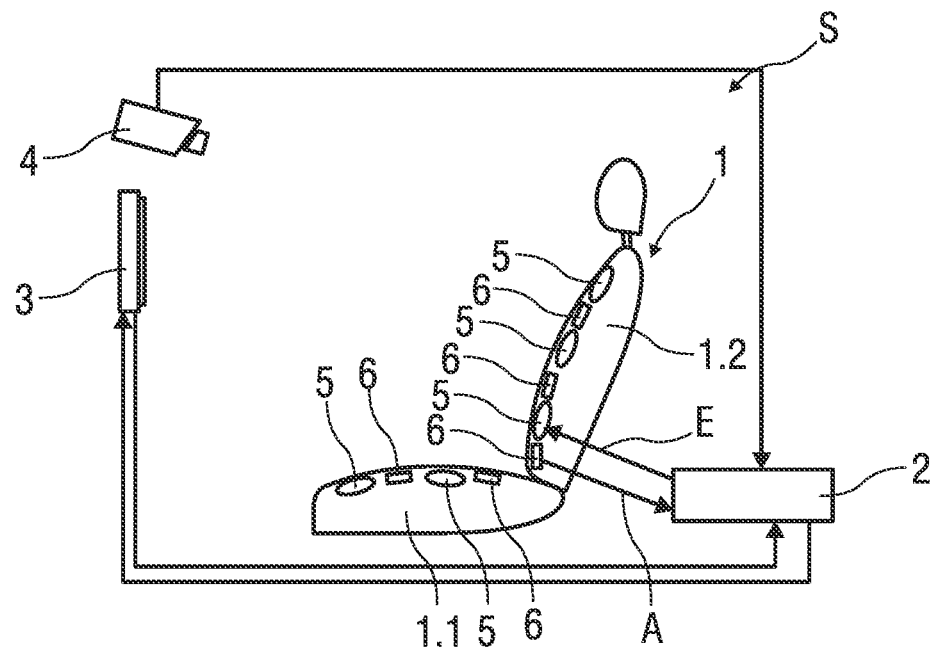
FIG. 1 shows, schematically, a seat system.

Parts corresponding to one another are provided with the same reference numerals in all figures.

FIG. 1 shows a seat system S having a vehicle seat 1, a control unit 2, a display unit 3 and a camera 4, the detection range of which is directed at the vehicle seat 1. In addition, the seat system S comprises moveable elements 5 and pressure sensors 6 which can be controlled by means of the control unit 2 and are integrated in a seat cushion 1.1 forming a seat surface and in the seat back 1.2.

The moveable elements 5 are in particular so-called massage bubbles, which are arranged in predetermined areas of the seat cushion 1.1 and the seat back 1.2.

A vehicle seat 1 designed as a massage seat, which requires interaction with a user, in particular a driver of the vehicle, is known from the prior art.

Sitting leads to hardly any or to one-sided static muscle work of the user, which may cause pain and discomfort. In addition, monotony and consequent inattention and fatigue of the user can frequently occur during comparatively long motorway journeys.

In order to improve, in addition to a level of comfort, in particular a level of seat comfort, a physical activity of motor functions, in particular coordinative abilities, of the user on the vehicle seat 1, the seat system S and a method described below, in particular for carrying out a training program for the user, i.e., for an occupant on the vehicle seat 1, are provided.

The method with respect to the seat system S can be applied to any sedentary activity, wherein the application is not limited to the vehicle seat 1, which can be arranged in any vehicle. It is also conceivable that the seating system S can comprise a piece of furniture, in particular an office chair.

The seating system S is designed in such a way that it predetermines a movement to be performed by the user in the form of muscle training. Here, a feedback to the user takes place as interaction.

As described above, the seating system S comprises the moveable elements 5 and the pressure sensors 6 for this purpose, wherein the user has the option of activating and deactivating the execution of the muscle training.

According to the present exemplary embodiment, a prompt to perform muscle training is output to the user on the vehicle seat 1 by means of a visual output on the display unit 3.

Alternatively or additionally, a signal can also be output acoustically and/or haptically as a prompt.

Preferably, instruction is given in haptic form by controlling the moveable elements 5, wherein visual clarification via the display unit 3 is conceivable.

The user can confirm or reject the execution of the muscle training.

Figure 2:
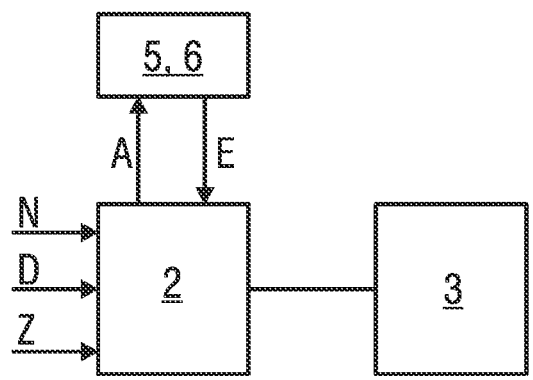
FIG. 2 shows, schematically, a block diagram of the seat system.

By way of example, the user is prompted to press against the seat back 1.2 with his right shoulder. By means of at least one pressure sensor 6 arranged in the corresponding area of the seat back 1.2, the pressure exerted by the shoulder on this area is detected. Based on detected signals of the pressure sensor 6, which are fed to the control unit 2, a temporal and spatial correspondence of the executed movement of the user with a specification of the seat system S is determined. Thus, a deviation between the exerted pressure as input signal E and a specification as output signal A is determined, as shown by means of the block diagram in FIG. 2.

In particular, the detected input signals E of the at least one pressure sensor 6 compared to the output signal A are used to determine whether the user is pressing as fast as possible and in the correct position of the vehicle seat 1, wherein it is also determined whether more body areas are involved in the application of pressure than required. Thus, the aim of the muscle training is for the user to learn to perform his/her movement more precisely.

Thus, the output signal A is compared with the input signal E, wherein the comparison refers to the temporal as well as the spatial correlation between the output signal A and the input signal E. The input signal E is thus evaluated not only in terms of an amplitude of the pressure exerted, but also in terms of whether the pressure sensor 6 assigned to the required area was actuated at a certain time.

Such an algorithm for comparing the input signal E with the output signal A enables an assertion about a coordination of the user. By means of the display unit 3, the amplitude of his/her exerted pressure can be displayed as information.

The camera 4 as a component of the seat system S continuously captures image data, wherein additional movements of the user in the space can be detected and, if necessary, taken into account during the execution of the muscle training. Thus, not only quasi-isometric movements but also more complex movements in the space, in particular in the vehicle, can be detected. These can be used as an extension of the training content and to correct the training.

In one embodiment of the seating system S, the user's breathing is detected while performing a motor task, i.e., during a training session. Thereby, corresponding to scientific literature, the user is given a cue to exhale during a muscle contraction, i.e., during the application of pressure to the required area of the vehicle seat 1, and to inhale during the release of pressure on the muscles.

A rhythm of the user's breathing is compared to a predetermined rhythm, wherein a deviation is determined and it is indicated to the user whether his/her breathing has the predetermined rhythm.

Furthermore, the method provides that a training process is offered to the user based on the detected input signals E and the output signals A. By means of a corresponding algorithm, the user is assigned to a training level based on the detected input signals E of the seat system S, which can be displayed to the user as feedback. During a training process, increasingly difficult sequences, i.e., training sessions are offered, whereby the complexity of the muscle training is increased.

Depending on the determined training level, an exercise can be selected as the next training session for the user, such that the user's training level and a training goal are taken into account. By means of the seating system S, after the user has used the seating system S several times, user-specific muscle training is possible. By way of example, the user can be identified based on detected signals from the pressure sensors 6 and/or based on detected image signals from the camera 4 and/or based on other information provided in the vehicle. Once the user has been identified, a suitable training session can be selected, also depending on the training level in relation to previous muscle trainings. For this purpose, for example, user data N can be detected and stored.

Another possible embodiment provides that the input signals E and the output signals A are used in order to offer the muscle training to the user in a game-like manner. In particular, body movements of the user can be used as a control signal for the game. It is also possible that the user's body movements on the vehicle seat 1 are additionally used as a further input and/or control element.

If several seats 1 are part of the seating system S, the input signals E of the vehicle seats 1 can be compared with one another, such that a comparison between several users is possible. The users can thus, for example, perform a joint muscle training and/or a competition. The competition can also be performed against a computer unit not depicted in more detail.

In a possible development, the completion of a training session can be represented, for example, by means of a score, wherein the scores of multiple users are compared via a digital path, for example, by means of an application program on a respective mobile device of the respective user.

By way of example, the performance of the muscle training can be used to detect a driver state. By way of example, the training session can be selected as a training or game recommendation during a driving session, such that the training session contributes to driver state optimisation.

It is also conceivable that the user is offered the performance of a training session depending on a state Z determined on the basis of detected image data of the camera 4, in order to increase the user's attention, i.e., to improve the state Z in relation to driving operation.

Alternatively or additionally, detected vehicle data D represent input variables of the seat system S. By way of example, a detected current vehicle position and/or detected signals of at least one acceleration sensor of the vehicle are used as vehicle data D. Based on the vehicle data D, a current driving situation can be taken into account in order to predetermine a training level which is at least optimised for the user. In particular for improving the driver's condition, e.g., to counteract a monotony of the driving operation, the inclusion of the vehicle data D appears to be useful.

By means of the seat system S and the method for operating the seat system S, the quality of movements of the user can be improved, wherein, due to the fact that the muscle training is performed during the driving operation of the vehicle, the user performs so-called double task training. On the one hand, the user performs the driving task as the driver, and on the other hand, he/she completes the muscle training.

The invention claimed is:

1. A method for operating a seat system, wherein the seat system includes a vehicle seat having a plurality of controllable moveable elements integrated into a seat cushion that forms a seat surface and/or into a seat back, comprising the steps of:
   prompting, during an activated muscle training program, a user on the vehicle seat to exert a pressure with a specific body region of the user on a predetermined region of the vehicle seat in which at least one of the plurality of controllable moveable elements is arranged;
   detecting a pressure exerted by the specific body region of the user on the predetermined region of the vehicle seat;
   comparing the pressure exerted by the specific body region of the user on the predetermined region of the vehicle seat as an input signal to a specification as an output signal; and
   providing feedback to the user based on the comparing regarding the user's performance of the muscle training program.

2. The method according to claim 1, wherein the pressure exerted is detected by a pressure sensor.

3. The method according to claim 1, wherein the prompting is performed visually, acoustically, and/or haptically.

4. The method according to claim 1 further comprising selecting the muscle training program depending on a training level of the user.

5. The method according to claim 1, wherein the muscle training program depends on detected vehicle data, on a detected state of the user, and/or on user data.

6. A method for operating a seat system, wherein the seat system includes a vehicle seat having a plurality of controllable moveable elements integrated into a seat cushion that forms a seat surface and/or into a seat back, comprising the steps of:
   prompting, during an activated muscle training program, a user on the vehicle seat to exert a pressure with a specific body region of the user on a predetermined region of the vehicle seat in which at least one of the plurality of controllable moveable elements is arranged;
   determining a local and a temporal deviation between a pressure exerted by the user as an input signal and a specification as an output signal; and
   detecting breathing of the user during the muscle training program.

7. The method according to claim 6 further comprising comparing a rhythm of the breathing to a predetermined rhythm and outputting feedback to the user if a deviation of the rhythm to the predetermined rhythm is detected.

8. A seat system, comprising:
   a vehicle seat having a plurality of controllable moveable elements integrated into a seat cushion that forms a seat surface and/or into a seat back;
   a pressure sensor; and
   a control unit configured to prompt, during an activated muscle training program, a user on the vehicle seat to exert a pressure with a specific body region of the user on a predetermined region of the vehicle seat in which at least one of the plurality of controllable moveable elements is arranged, to control the plurality of controllable moveable elements, to compare a pressure exerted by the specific body region of the user on the predetermined region of the vehicle seat detected by the pressure sensor as an input signal to a specification as an output signal, and to provide feedback to the user based on the comparison regarding the user's performance of the muscle training program.

9. The seat system according to claim 8, wherein the control unit is connected to a display unit and wherein the display unit displays a prompt to perform the muscle training program, the feedback to the user, and/or a selection of the muscle training program.

10. A vehicle, comprising:
    the seat system according to claim 8.

* * * * *